United States Patent [19]

Ritter

[11] Patent Number: 4,623,203
[45] Date of Patent: Nov. 18, 1986

[54] COMMUTATOR

[75] Inventor: Robert A. Ritter, Calgary, Canada

[73] Assignee: Alberta Oil Sands Technology and Research Authority, Edmonton, Canada

[21] Appl. No.: 780,269

[22] Filed: Sep. 26, 1985

[51] Int. Cl.$^4$ .......................................... H01R 39/06
[52] U.S. Cl. ................................................... 339/5 P
[58] Field of Search ............. 339/5 R, 5 A, 5 M, 5 S; 310/230, 237, 241, 243

[56] References Cited

U.S. PATENT DOCUMENTS

| | | | |
|---|---|---|---|
| 2,774,831 | 12/1956 | Lafferty et al. | 339/5 M |
| 3,060,397 | 10/1962 | Mims et al. | 339/5 M |
| 3,517,369 | 6/1970 | Buschbom | 339/5 A |

*Primary Examiner*—Eugene F. Desmond
*Attorney, Agent, or Firm*—Ernest Peter Johnson

[57] ABSTRACT

A stepping commutator is provided for supplying power to a plurality of electrode plates mounted on a rotating shaft. The commutator comprises a central annular plate which is fixed to the shaft. The plate has a ring of cylindrical stationary contacts mounted therein concentrically about the shaft, so that they rotate with the shaft. Means are provided for connecting the contacts with the electrode plates. A pair of annular second plates bracket the central plate. Said pair of second plates are free to rotate on the shaft. Each such second plate carries a ring of horizontally slidable cylindrical contacts arranged to correspond with the central contacts. Said slidable contacts are connected with a power source. Means are provided for biasing the slidable contacts into or out of engagement with the central contacts, when appropriate. Means are provided to interconnect the two second plates so that, when one second plate rotates through a small angle, the other second plate rotates through an equal and opposite angle. A microswitch assembly controls the assembly to actuate the biasing means to slide one set of movable contacts into engagement with the central contacts and then to slide the second set of movable contacts into such engagement while withdrawing the first set.

1 Claim, 15 Drawing Figures

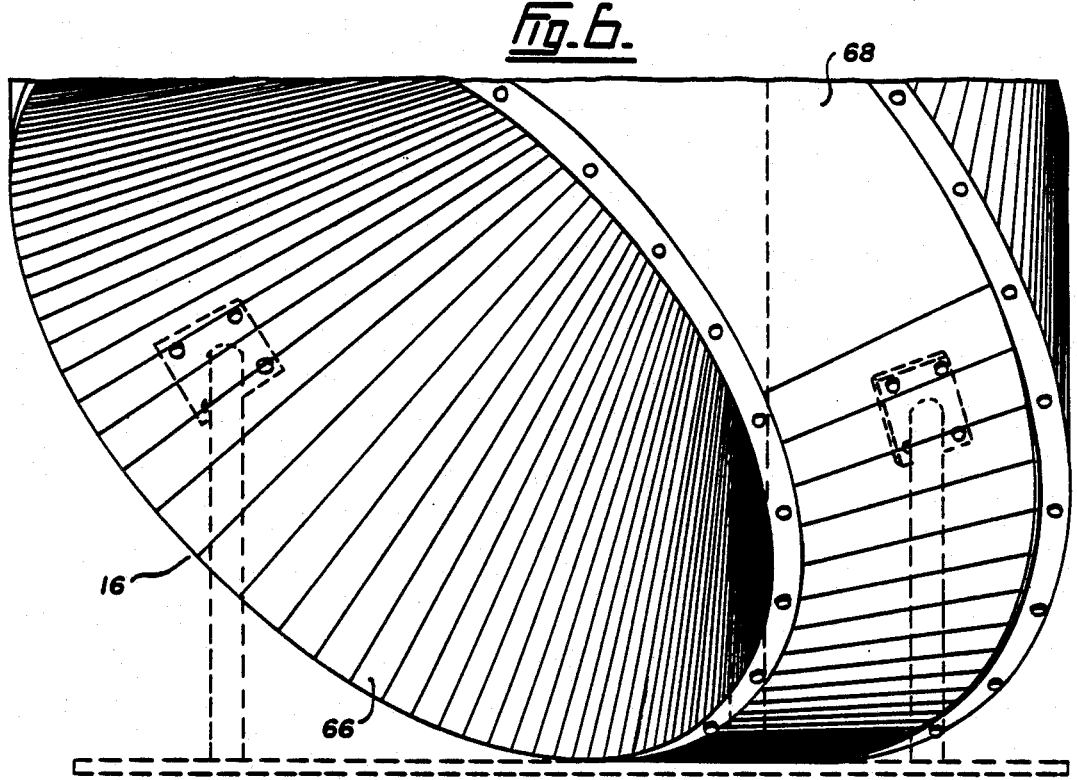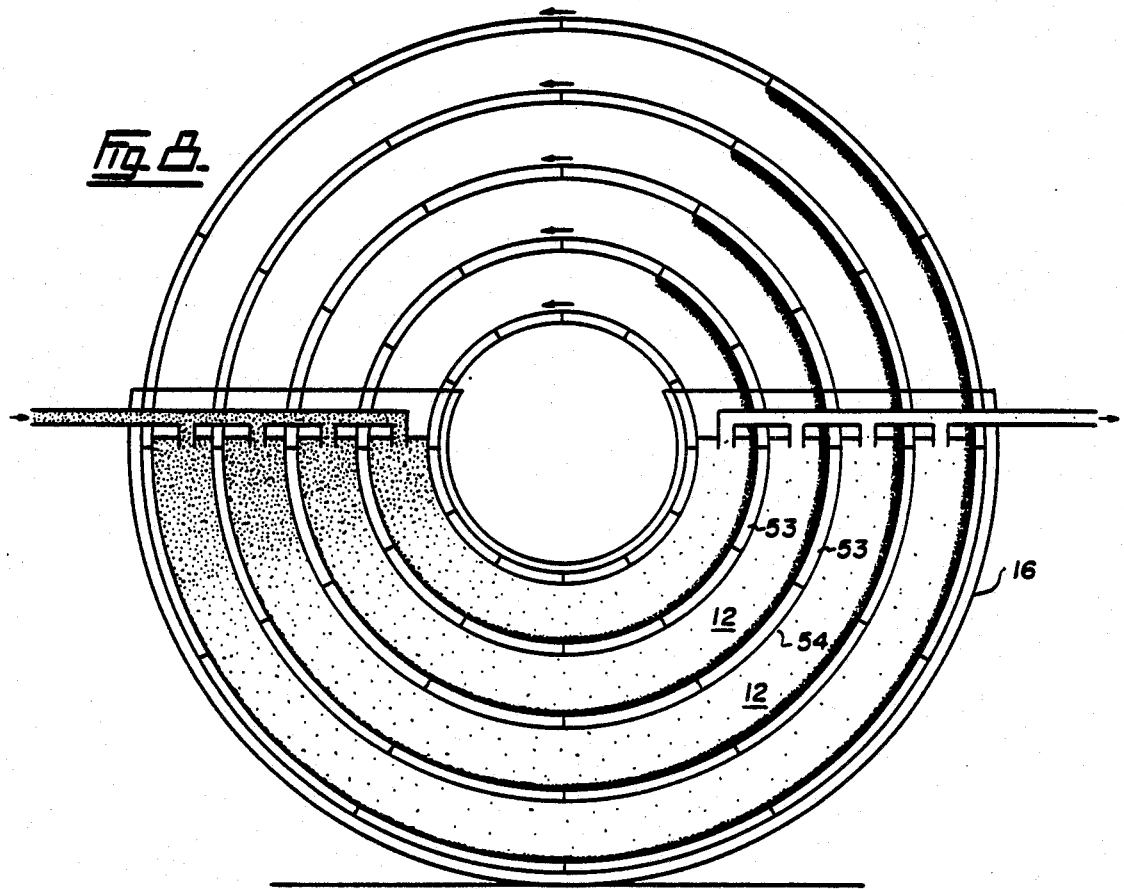

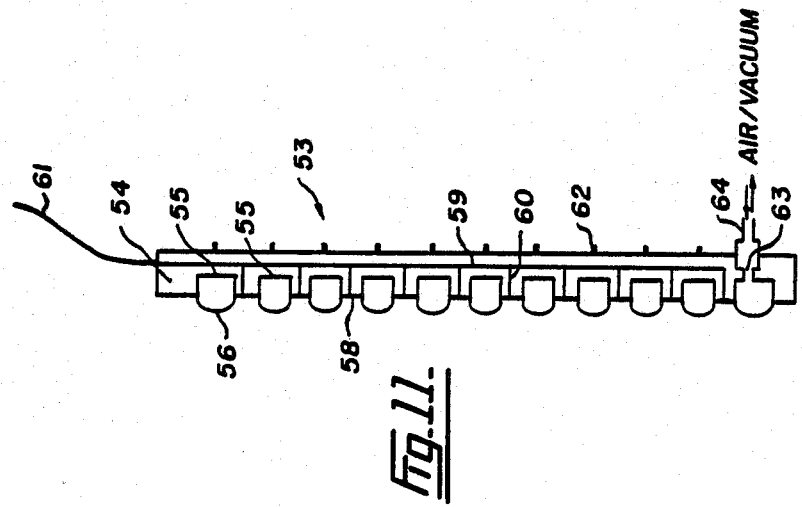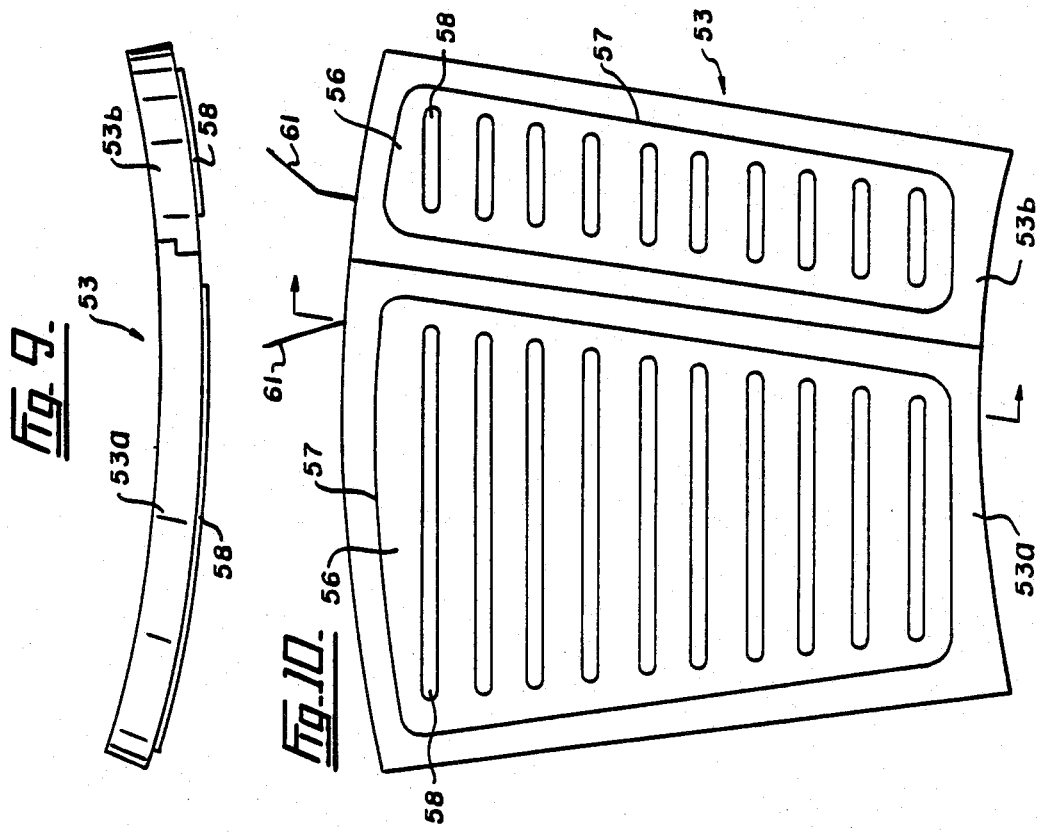

COMMUTATOR

BACKGROUND OF THE INVENTION

This invention relates to an apparatus for effecting the continuous separation of particulate solids from a liquid suspension of said solids. In a particular embodiment it relates to a clarifier, although the concepts embodied in the apparatus could be applied to filtration or drying units.

The embodiment of the invention which has been built and tested was a clarifier. This clarifier was designed to treat the clay-inwater tailings suspension which is a waste stream from a facility which extracts bitumen from mined tar sands using a process known as the hot water process. While not limited to such use, the clarifier will be discussed below in connection with certain needs and requirements which arise when one comes to treating such tailings. Also, the specific form of clarifier which has been built and tested was one which incorporated electrodes and used the process mechanisms of electrophoresis and reverse osmosis to collect and dry the solids present in such tailings. Therefore, while the invention is not limited to electrodes as the means for collecting and drying the solids, it will be described with reference to the needs and requirements of such an embodiment.

In northern Alberta, there are presently two commercial facilities or plants which extract bitumen from mined tar sands using the hot water extraction process. These are very large plants—they each produce about 100,000–150,000 barrels of partly refined oil product per day.

The tar sand itself is something akin to a dark fine beach sand. It comprises relatively coarse quartz grains sheathed in thin films or envelopes of connate water. The bitumen or oil is entrapped in the interstices between the water-sheathed sand grains. Minute clay particles, referred to as "fines", are contained in the water sheaths.

In accordance with the first step of the hot water process, the tar sand is mixed with hot water and a small amount of "process aid" (usually NaOH), and mulled in a rotating drum. This operation is referred to as "conditioning" the tar sand. It effects a preliminary dispersion of the bitumen and solids. The resultant slurry is then diluted with additional hot water and introduced into a thickener-like vessel known as a primary separation vessel. The diluted slurry is held in this vessel under quiescent conditions for a period of time. The largest part of the bitumen becomes associated with air bubbles, entrained during conditioning, and rises to form a froth surface layer. This froth is recovered. Most of the heavy sand particles, together with water, some fines, some bitumen, some process aid, and surfactants produced by reaction of the process aid and bitumen, sink and leave the vessel through a bottom outlet. This stream is referred to as "primary tailings". A large portion of the fines and some non-buoyant bitumen collect in the mid-section of the vessel contents A dragstream from this zone, termed "middlings", is withdrawn and introduced into a series of induced air flotation cells. Here the middlings are contacted with a flood of minute air bubbles and much of the contained bitumen is aerated and rises to form "secondary froth", which is recovered. A tailings product, referred to as "secondary tailings", is passed out of the bottom outlets of the flotation cells. These secondary tailings comprise water, some fines, some bitumen, some process aid, and some surfactants.

The primary and secondary tailings are combined and discharged onto the shore of a large tailings pond. Here, the heavy sand grains immediately settle out and form a beach.

This leaves a suspension of fines in water, bitumen, process aid, and surfactants. The fines settle, but not into the form of a compact mass. Instead they form a structure somewhat like a house of cards. This bottom portion of the pond is a mixture known to the industry as "sludge" and it comprises fines, water, some sand, some bitumen, and small quantities of NaOH and surfactants. The mineral content ranges from 11 to 40% by weight.

The volume of sludge so formed is enormous. In the order of 1 gallon/minute is formed for every 10 barrels/day of oil produced. It accumulates at a rate in the order of 20,000 acre feet per year per plant. It has been calculated that the tailings pond for one of these plants will cover 10 square miles at the end of a 25 year period of operation.

There is a substantial quantity of process water tied up in the sludge. It cannot be recycled to the hot water process unless its solids content is reduced to about 3% by weight or less. If the solids were to be separated from the water, it would be desirable that the moisture in the solids fraction be in the order of 50% by weight or less, so that the solids could be worked by bulldozers and the like.

From the foregoing, it will be noted that a clarifier for this particular sludge feedstock should be characterized by the following:

it should be continuous and capable of treating the large volume at low cost; and it should be capable of separating the solids and liquid to produce a clarified water product containing only up to 3% solids and a dried solids product containing in the order of 50% moisture of less.

Applicant has worked for several years developing a viable clarifier for this purpose.

The approach taken was to use spaced anode and cathode electrodes, to cause deposition of solids on the anode by electrophoresis and to dry the deposit by driving water out of it by reverse osmosis. As is known, if an anode and cathode are submerged in spaced apart relation in a solids-water suspension, and potential is applied to the electrodes, the solids will migrate to and collect on the anode by electrophoresis and, with sufficient retention time, water trapped in the solids deposit will move out of it by reverse osmosis.

Applicant evolved a system comprising:

a trough for containing the sludge to be treated;

a travelling anode comprising anode bars transversely mounted on the surface of an endless, driven conveyor belt disposed at an angle and partly submerged in the suspension, so that, on the upper leg of travel, the anode bars moved from a low starting point in the suspension, up through the suspension, and then out of the suspension and beyond the end of the trough, before rounding a roll and commencing a downwardly inclined leg of travel back to the starting point (the solids dropping off at the roll);

and an elongate, fixed cathode suspended in the suspension in parallel spaced relation to the upper leg of the anode.

In the operation of this unit, it was found that, if the electrodes were closely spaced, in the order of 2-5", if a voltage of 4-25 volts was used, if the sludge was suitably chemically pre-conditioned with 0.5 to 3.5 grams/liter of lime, if the pH was maintained in the range 8.5 to 11.5 using a carbonate-forming reagent such as $CO_2$, and if a retention time in the order of 4 hours was observed, then the desired objectives, of obtaining a desirably dry solids deposit and a desirably clarified water, could be achieved.

However, testing and cost analysis established a fundamental shortcoming of this system, namely: that because the volume of sludge to be treated is so large, and the retention time is so long, and the depth of sludge which can be treated between one pair of electrodes is so small, one would require a very large surface area of electrodes to carry out the treatment. This would result in an inordinate extent of land use and capital costs that would be impractical.

So it was with this background that applicant set out to devise a clarifier capable of providing a large active surface area relative to its overall size and land use, which clarifier would incorporate gravity settling and which would be capable of transporting the solids out of and away from the liquid, for disposal.

SUMMARY OF THE INVENTION

In accordance with the invention, there is provided apparatus comprising a shell of conical configuration. This shell is adapted to be rotated about its apical axis. The shell is tilted, so that its apical axis is upwardly inclined at an angle to the horizontal, preferably at about 45°. Thus the base of the shell, when viewed from the side, is also tilted relative to the horizontal, for a purpose to be explained.

A series of nested, spaced apart, truncated, conical bands are secured to the inner surface of the shell and are contained within its confines. The base or large diameter ends of the bands each abut the shell. The bands and shell form a solid unit and rotate as one.

Preferably, the shell is of a right cone configuration, having a 90° apex angle, the bands also have a right cone configuration, and the bands are affixed generally perpendicularly to the shell.

A containment vessel is provided to hold the slurry to be treated. The lower portion of the cone extends down into the vessel, to treat the slurry. Preferably an open-topped, trough-like containment vessel is provided, to extend upwardly around the shell(band unit part way up the latter's height. The inner wall of the preferred containment vessel snugly engages the exposed end surfaces of the shell and bands through most of their rotational travel. Most preferably, the containment vessel is formed of three conical segments joined together and adapted to closely conform to the outer surfaces of the shell, the outermost band, and the exposed band end surfaces. The inner wall of the containment vessel extends upwardly across only a part of the rotating unit. Thus, an upper part of each band overhangs the containment vessel inner wall, due to the tilted arrangement of the rotatable unit. This overhanging arrangement makes it possible for solids, dislodged from the upper surface of each band as it travels through the zenith of its path, to drop free of the containment vessel.

Suitable means are provided for suspending and rotating the shell-band unit in the containment vessel.

It will be noted that the shell, the bands and the containment vessel inner wall cooperate to form a stack of elongate, arcuate treatment chambers of generally rectangular cross-section.

Means are provided for supplying feedstock, to be treated, to one end of each such chamber. Means are also provided for removing clarified liquid from the other end of the chamber.

Each band comprises means, on its upper surface, for attracting and collecting solids particles from the feedstock being treated. In the preferred embodiment illustrated, such means comprise an anode electrode mounted on the upper surface of the band. In that particular embodiment, a cathode electrode is mounted on the lower surface of each band. In this way, there is provided a pair of elongate spaced electrodes associated with each chamber and forming its upper and lower surfaces.

In use, feed slurry is introduced into a first end of each treatment chamber. The slurry flows through the chamber between the moving anode and cathode. The solids accumulate and are dried on the anode means, as the latter moves through the slurry, leaving clarified liquid. When the bands rise out of the containment vessel and move through the overhanging portion of their travel, the solids may be dislodged by suitable means and will drop free of the containment vessel. The clarified liquid is discharged from the second end of the chamber through outlet means.

A clarifier in accordance with the present design has been found capable of providing continuous, active, submerged utilization of 65% of the anode surface area. This percentage is much greater than the 25-30% that would normally be associated with a cylindrical configuration.

In another aspect of the invention, there is provided a novel commutator assembly, for supplying electrical power to the active elements, such as electrodes, of a rotating structure (for example, the aforementioned clarifier). This assembly comprises:

- a central support, such as an annular plate, affixed to the drive shaft of the clarifier, said support carrying a plurality of contacts arranged in a circular pattern concentric with the drive shaft, said contacts extending through the plate so as to be available for energization from both sides of the plate;
- conductive wires connecting the central support contacts with the electrodes;
- first and second support members, preferably annular, mounted on the drive shaft, one on each side of the central support, said support members being adapted to free wheel or spin on said shaft;
- each of said first and second support members carrying a plurality of contacts arranged in a pattern identical to the central support contacts and adapted to align with the latter, said support members being movable toward or away from the central support contacts, so as to make or break contact therewith;
- lead means for connecting the support member contacts with a source of electrical power;
- means, such as an expandable diaphragm and a return spring, for biasing the movable contacts of each support member into or out of contact with the central support contacts;
- each of said support members being operative to rotate with the central support when their contacts are engaged;

control means, such as a microswitch assembly which is responsive to the extent of rotational movement of that support member which is currently engaged with the central support, for actuating the biasing means to cause the contacts of the unengaged support member to be urged into contact with the central support contacts when the currently engaged support member has rotated through a predetermined angle, said control means further being operative to cause the biasing means to disengage the contacts of the currently engaged support member, whereby the contacts of first one and then the other of the support members are caused to become electrically and rotatively associated with the central support contacts in alternating sequence; and means, such as gears, for interconnecting the two support members and being operative to cause the currently non-engaged support member to rotate in a direction opposite to that in which the engaged support member is rotating in unison with the central support and through a rotational angle equal to that through which the engaged support member is rotated.

In operation, the two support members each oscillate back and forth through a small angle, while their contacts alternately energize the central support contacts. The angle of rotation could, for example, be one half of that between two adjacent contacts on the central support. As a result of this arrangement, the power leads to the contacts are twisted only slightly in use and damage thereto is negligible.

In addition, the contacts of the non-engaged support member make before the contacts of the engaged support member break. This "make before break" characteristic results in reducing arcing.

Since the movable contacts are positively biased by means such as a diaphragm, tight contact between the engaged contacts is possible, thereby reducing resistance and permitting of the transmission of higher electrical currents than is the case with conventional brush and slip ring assemblies.

And finally, the design of the novel commutator assembly leads to significant reductions in size and cost in comparison to otherwise available commutators of which applicant is aware.

Broadly stated, the invention is a commutator assembly for supplying electrical power to a rotating structure having one or more elements to be energized, comprising: a central support affixed to the structure for rotation therewith, said support carrying a plurality of contacts arranged along a circular line having a centre which coincides with the axis of rotation; conductive means connecting said contacts with the elements to be energized; first and second support members mounted on the structure and arranged to bracket the central support; said support members being adapted to free wheel on the structure; each support member carrying a plurality of contacts which are arranged to correspond with the central support contacts; each of said support members or its contacts being movable, whereby the contacts may be biased into or out of engagement with the central support contacts; lead means for connecting the support member contacts with a source of electrical power; means, associated with the first support member, for biasing its contacts into engagement with the central support contacts when said contacts are aligned and for disengaging them when the second support member contacts first engage the central support contacts; means, associated with the second support member, for biasing its contacts into engagement with the central support contacts when said contacts are aligned and for disengaging them when the first support member contacts first engage the central support contacts; said first support member and central support being operative to rotate together when their respective contacts are engaged; said second support member and central support being operative to rotate together when their respective contacts are engaged; and means, interconnecting the support members, for rotating the support member, whose contacts are not engaged, in a direction opposite to that in which the engaged support member is being rotated by the central support, and through an angle equal to that through which the engaged support member is rotated, whereby the two support members each oscillate back and forth through a small angle while their contacts alternatively energize the central support contacts.

DESCRIPTION OF THE DRAWINGS

FIG. 6 is a perspective view of the containment vessel;

FIG. 8 is a front view of the rotating unit, in section, showing feed being introduced and solids being deposited;

FIG. 9 is an end view of the electrode plate;

FIG. 10 is a top view of the electrode plate;

FIG. 11 is a side view, in section, of the electrode plate;

DESCRIPTION OF THE PREFERRED EMBODIMENT

Pilot Circuit

Figure 1:
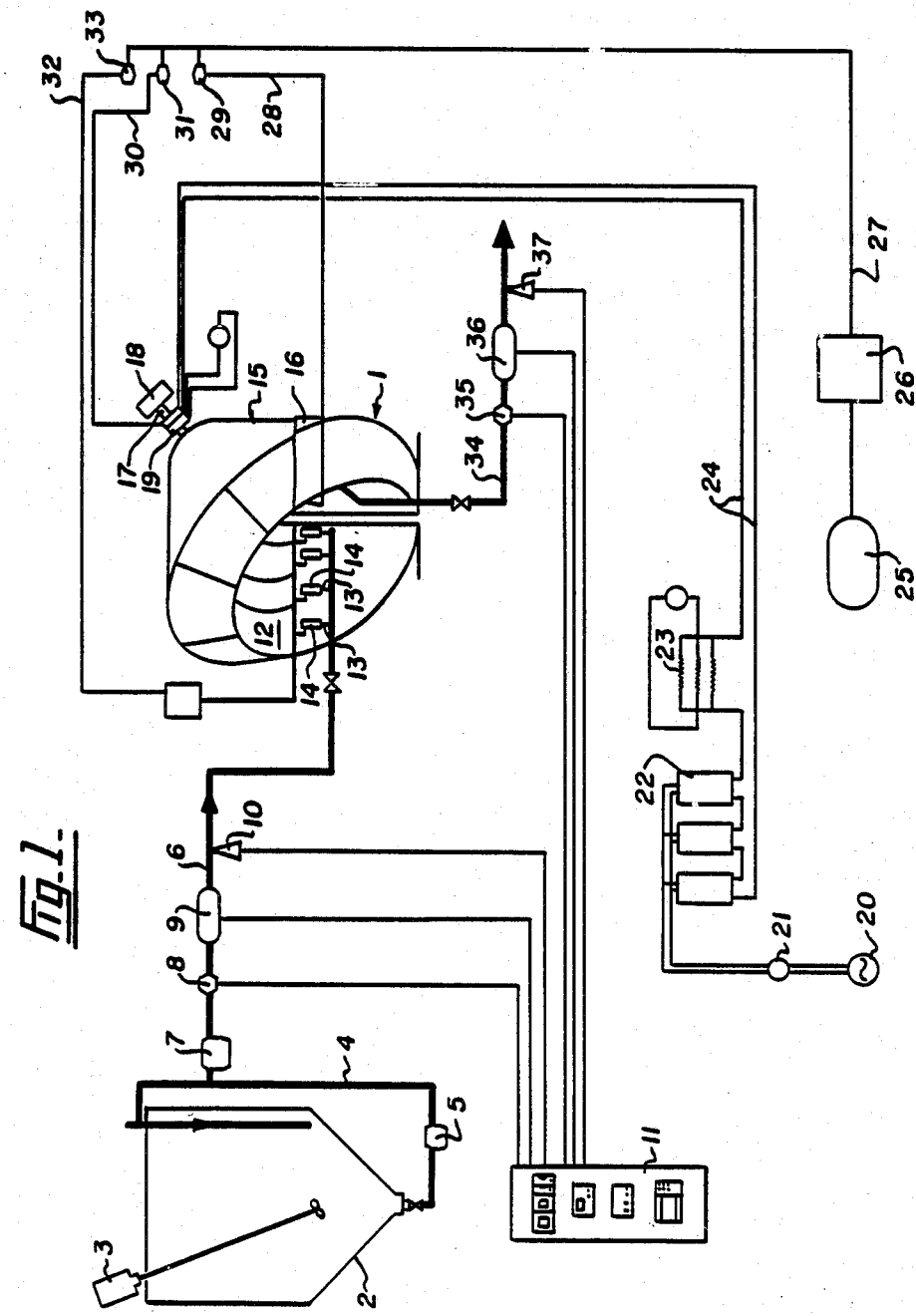
FIG. 1 is a schematic showing the pilot circuit used to test the clarifier.

The clarifier 1 has been tested and operated in a circuit shown in FIG. 1. In general terms, this circuit comprises:

(a) a slurry tank 2 for retaining a supply of the feed slurry or suspension, said tank 2 being equipped with a mixer 3;

(b) a recirculating line 4 connected with the bottom and top ends of the tank 2 and having a pump 5 for circulating slurry;

(c) a slurry feed line 6 joining the line 4 with the clarifier 1 and having a pump 7 for moving the slurry;

(d) a flow meter 8, density meter 9, and pH probe 10 in the line 6, said components being suitably connected with an instrumentation cabinet 11;

(e) the feed line 6 being separately connected with each of four treatment chambers 12 in the clarifier 1 by way of four branch lines 13, each controlled by a slurry flow distribution valve 14;

(f) the clarifier 1 having a rotating unit 15 suspended in a slurry containment vessel 16;

(g) the rotating unit 15 being mounted on a drive shaft 17, which is driven by a drive assembly 18;

(h) a commutator assembly 19 being mounted on the drive shaft 17, to supply power to the electrodes of the clarifier;

(i) a source 20 of power being connected, through a transformer 21, battery chargers 22, resistors 23, and leads 24, with the commutator assembly 19 and drive assembly 18;

(j) an air compressor 25 being connected through an air dryer 26 and supply line 27 with a first branch line 28, having a pressure regulator 29 and being connected with the solids removal diaphragm means, a second branch line 30, having a pressure regulator 31 and being connected with diaphragm means in the commutator assembly 19, and a third branch line 32, having a pressure regulator 33 and being connected with diaphragm means in the flow distribution valves 14; and (k) a discharge line 34, connected to each of the clarifier treatment chambers 12, and having a flow meter 35, density meter 36, and pH probe 37 associated therewith.

The Rotating Unit

As previously stated, the clarifier 1 comprises a rotating unit 15 which is suspended part way into a containment vessel 16, the two parts combining to form treatment chambers 12 containing slurry to be clarified.

The rotating unit 15 comprises a shell 38, which has a truncated cone configuration and an apex angle of 90°. This shell 38 is secured to the drive shaft 17 of the clarifier 1 by spokes 39 and is coaxial with said shaft. In the embodiment shown, the drive shaft 17 is disposed at an angle of 45° to horizontal. Thus, the shell 38 is rotatable and tilted. The shell 38 has its axis at an angle of 45° relative to horizontal.

The drive shaft 17 is mounted for rotation on a main pedestal 40 and a support 41. More particularly, the lower end of the drive shaft 17 is journalled in a first pillow block 42, mounted on the pedestal 40, and its upper end is journalled in a second pillow block 43 mounted on the support 41. The lower pillow block 42 is positioned at the calculated centre of gravity of the rotating unit 15 and thus the main pedestal 40 bears substantially all the weight of the unit 15. The upper pillow block and support 41 are provided mainly for dynamic stability.

The main pedestal 40 is adapted for vertical adjustment. More particularly, the pedestal 40 comprises a plate 44 which is attached to four downwardly extending legs 45. These legs 45 telescope into sleeves 46. Set screws 47 are provided to lock the legs 45 in the sleeves 46, when the drive shaft 17 is suitably positioned. The sleeves 46 are mounted to a base 48.

Affixed to the inner surface of the shell 38 is a plurality of racks 49. These racks 49 vary in size and are spaced apart inwardly from the shell's outer edge. Stated otherwise, they are 'nested'.

Each rack 49 is a rigid frame of truncated, right angle cone configuration. It is formed of inner and outer peripheral rings 50, 51 joined by a number of "H" channels 52. Each outer or large diameter ring 51 is secured to the shell 38 and the rack is arranged to extend inward perpendicularly from the shell wall.

The racks 49 each function to support a layer of truncated, 'pie-shaped', conical segment electrode plates 53. Together each rack 49 and its associated electrode plates 53 make up a band 54 of truncated, right cone configuration.

A typical electrode plate 53 is illustrated in FIGS. 9–11. Each such plate 53 is made up of two parts 53a, 53b, which together 21 form the truncated 'pie-shaped' unit. As shown, the one part 53b of each plate is generally rectangular in shape, while the other part 53a is pieshaped. In addition, the two parts 53a, 53b have a common contact edge, which is stepped, so that they will interlock. The width of the part 53a along its upper or shell-abutting edge is equal to the width of the two parts 53a, 53b along their lower edge. This arrangement enables the plate parts to be individually inserted into or withdrawn from the rack 49 from the latter's open end. When the plates 53 are in place on a rack 49, they can be locked in place with an edge clamp (not shown).

Each plate part 53a, 53b comprises a body 54, having a plurality of spaced apart depressions 55 formed in its upper surface. A flexible, elastic sheet 56 overlies the upper surface of the body 54 and is sealed to said surface with adhesive around its edge 57. This sheet 56 provides an expansible diaphragm for dislodging solids accumulated thereon, when they are to be dumped, as will be explained below.

A plurality of anode bars 58 are positioned on the upper surface of the diaphragm sheet 56, between the depressions 55.

A pair of conductive strips 59 are embedded in parallel spaced relation in each body 54. These conductive strips 59 extend the length of the body 54 and pass beneath the ends of the anode bars 58 associated with that body. Conductive bolts 60 secure the anode bars 58 with the strips 59.

A conductive wire 61 extends into each plate body 54 and is connected with the strips 59, to supply power to the anode bars 58. As is described further below, the wire 61 is connected with the commutator assembly 19 and has connection with the power leads 24.

Each electrode plate 53 further carries on its lower surface a copper cathode wire 62 which winds, in a zig-zag fashion, across said surface. Each such cathode wire 62 is connected with the power leads 24.

An air passage 63 extends through each electrode plate body 54 and communicates with the cavity space formed between each diaphragm sheet 56 and its associated body 54. These air passages 63 are connected with the branch line 28, for the supply of pressurized air thereto, through air tubes 64 and a control valve 65, described below. When pressurized air is admitted by the control valve 65 to said spaces, the diaphragm sheet 56 is distended or expanded, to disturb and dislodge the solids accumulated thereon.

From the foregoing, it will be understood that there is provided a suspended, tilted, rotatable conical shell 38 which supports a plurality of spaced apart, nested racks 49. Each rack 49 carries a truncated, conical layer of electrode plates 53 which have anode means mounted on their upper surfaces. Cathode means are mounted on the lower surfaces of the plates 53. Thus, elongate anode and cathode electrodes are provided which extend in parallel, spaced, opposed relation. The electrodes so provided move along a circular path as the shell 38 rotates. Electric potential can be applied to each array of opposed anode bars 58 and cathode wires 62, to treat the suspension between them. The diaphragm sheets 56 can be distended outwardly at the appropriate moment, by application of air pressure from below, to dislodge solids collected on the plates 53.

Figure 3:
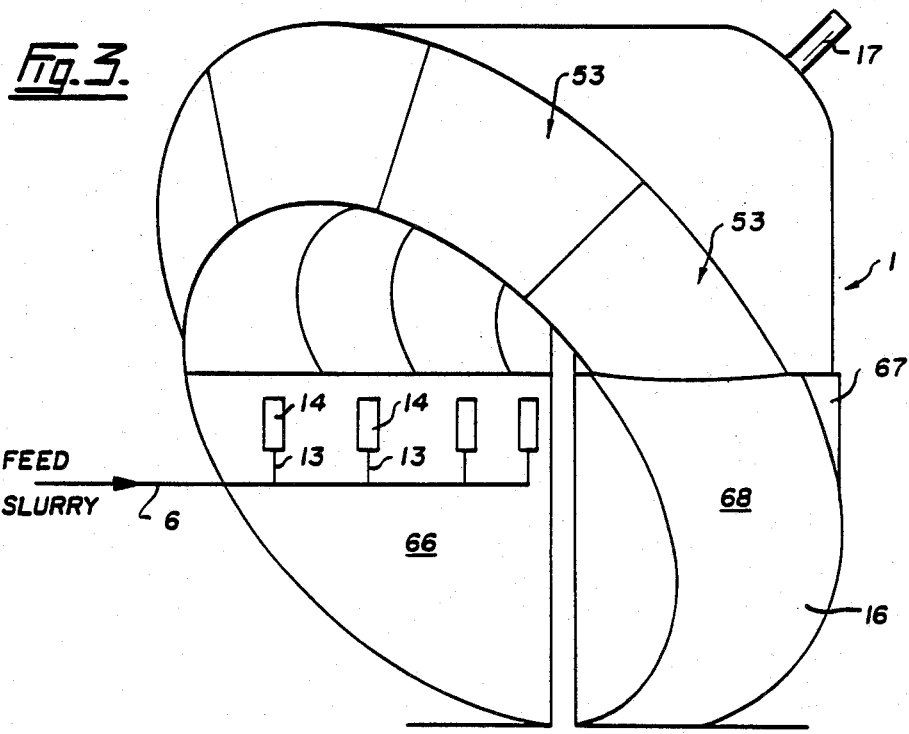
FIG. 3 is a schematic perspective view of the rotating unit positioned in the containment vessel.
Figure 7:
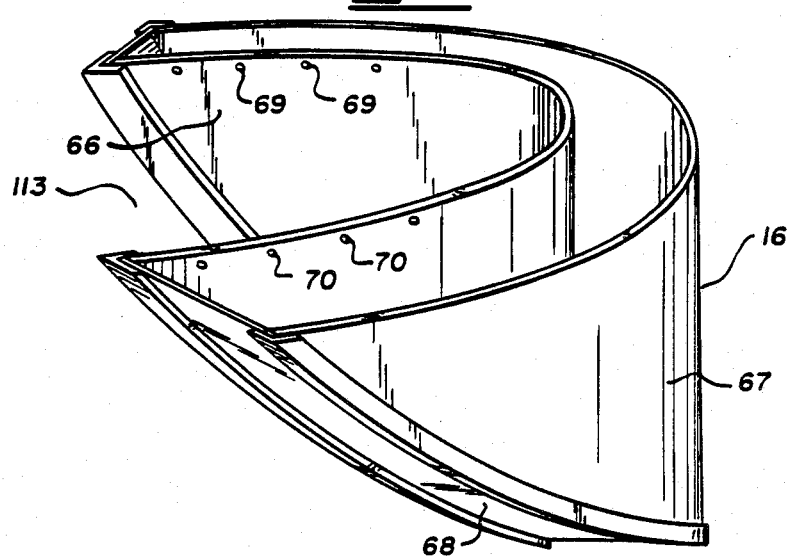
FIG. 7 is a perspective view of the containment vessel from a different angle than that of FIG. 6.
Figure 12:
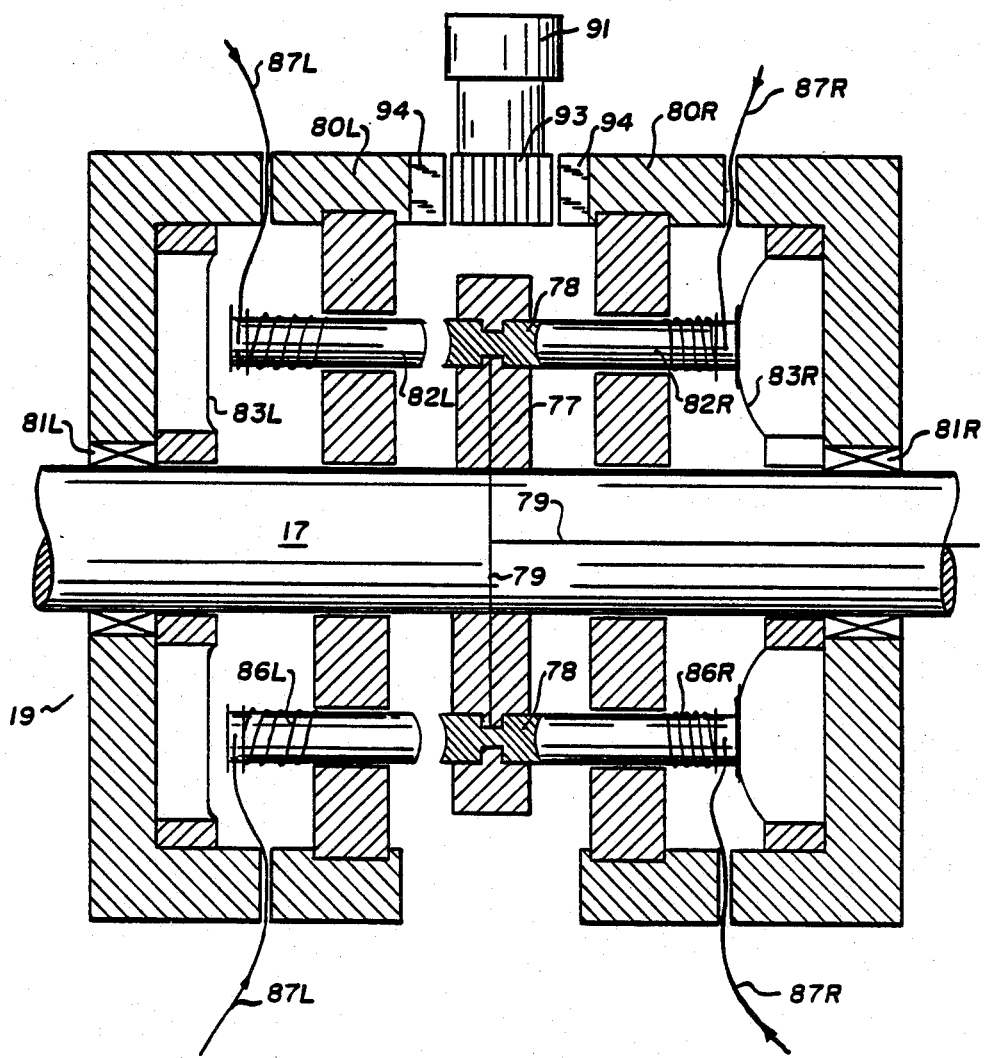
FIG. 12 is a side sectional view of the commutator assembly.
Figure 13:
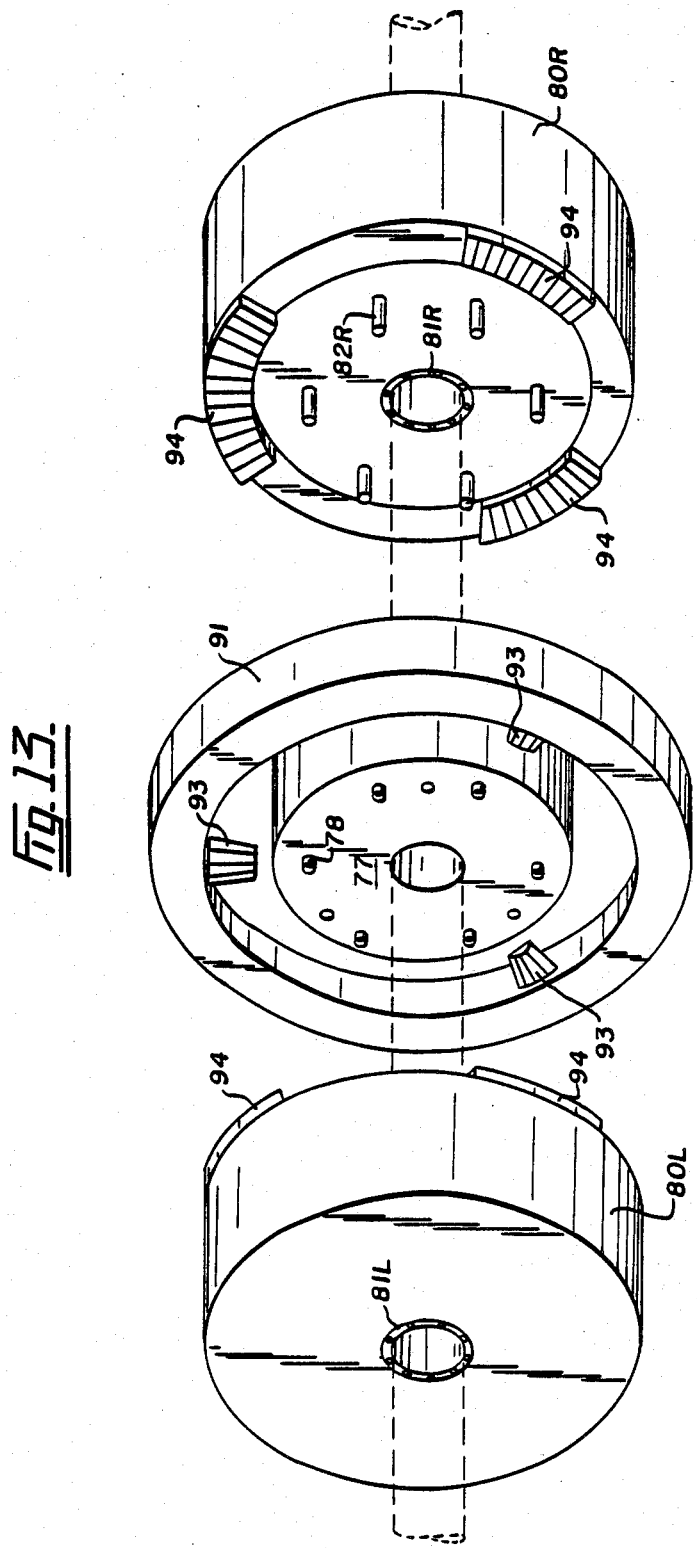
FIG. 13 is an exploded perspective view of the commutator assembly.

Having reference now to FIGS. 3, 6 and 7, there is shown a trough-like containment vessel 16 into which the rotating unit 15 extends. The vessel 16 is formed by joining together inner, outer and bottom walls 66, 67, 68 which are segments of suitably dimensioned truncated cones. The inner or front wall 66 closely abuts the lower, open part of the rotating unit 15. While not shown, the edges of the bands 54 are provided with a downwardly hanging edge lip or baffle of rubber, which lips seal liquid-tight against the abutting surface of the vessel front wall 66.

Figure 2:
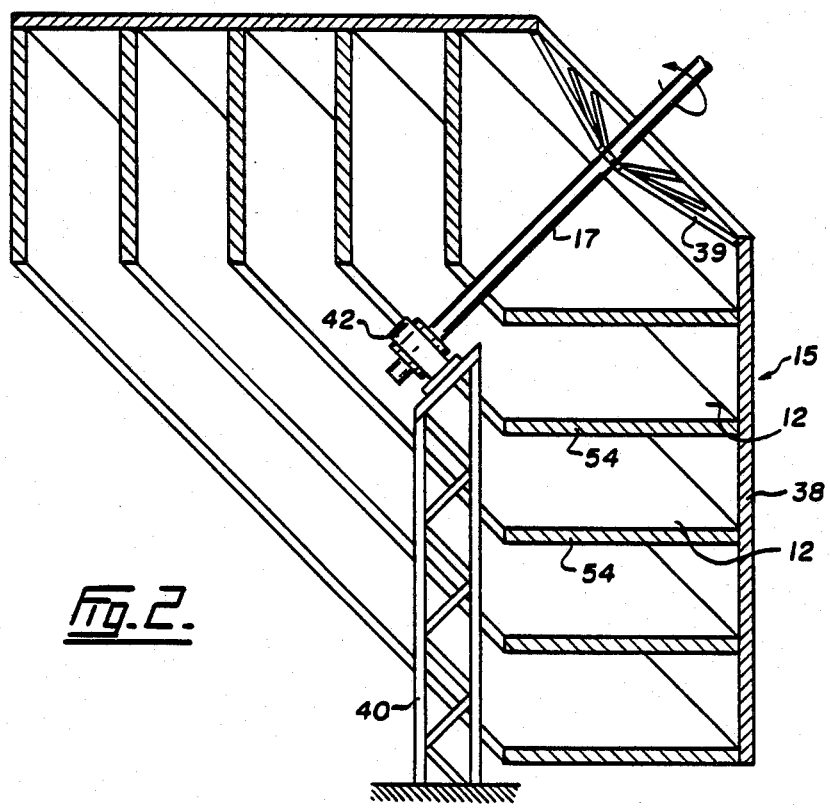
FIG. 2 is a simplified side view of the rotating unit, in section, showing the shell, bands, drive shaft, and pedestal.
Figure 4:
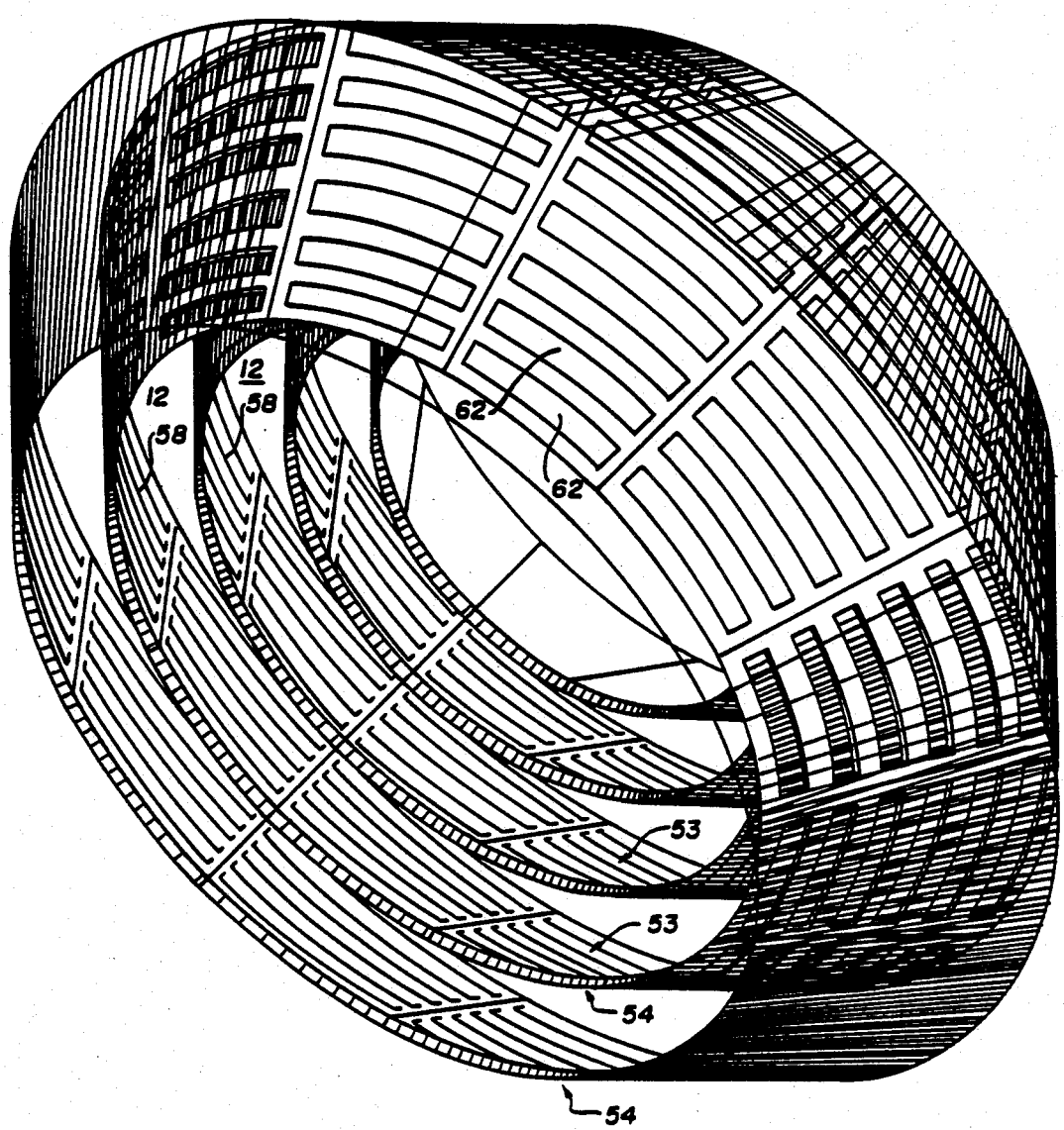
FIG. 4 is a perspective view showing the conical bands.
Figure 5:
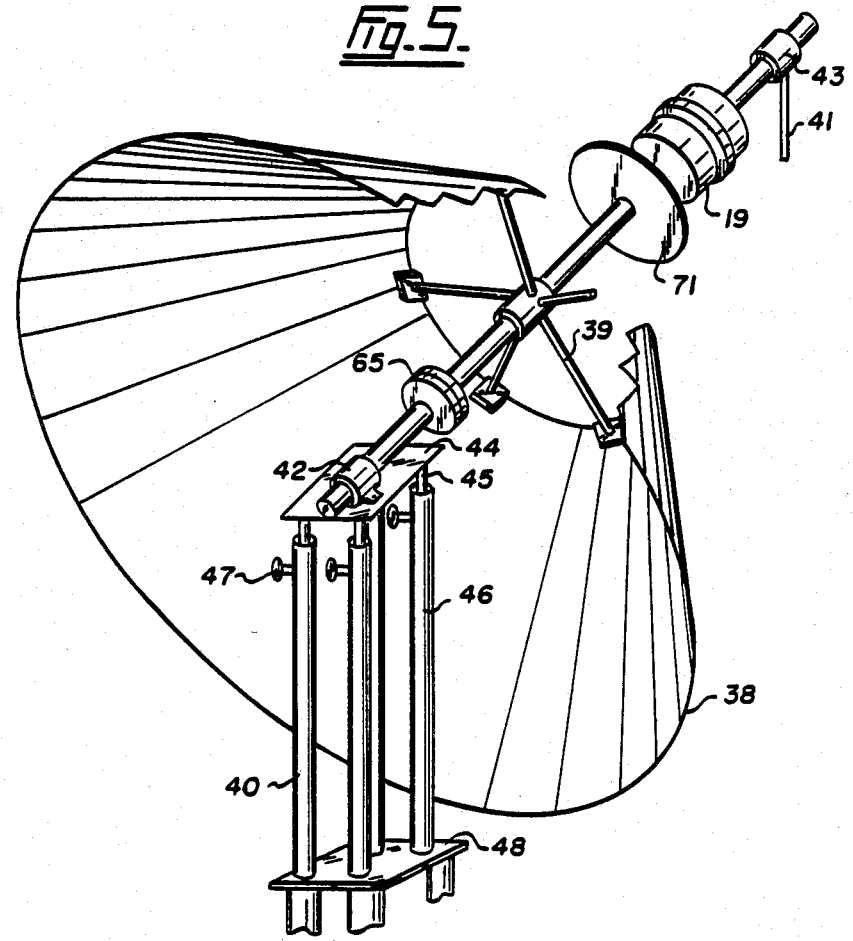
FIG. 5 is a perspective view showing the shell, drive shaft, pedestal, and the components mounted on the drive shaft.

As a result of this arrangement, a generally vertical stack of elongate, arcuate treatment chambers 12 are defined by the vessel front wall 66, the pairs of adjacent bands 54, and the shell 4. These chambers 12 are most clearly seen in FIGS. 2 and 4. Each such treatment chamber 12 has an anode electrode forming its lower surface and a cathode electrode forming its upper surface.

Feed means and oqtlet means are provided at each end of each treatment chamber 12, for feeding fresh suspension thereinto and removing clarified water therefrom. As previously described, the slurry feed line 6 is connected with each treatment chamber 12 through an aperture 69 in the vessel front wall 66 by a branch line 13, the flow through each such branch line 13 being controlled by a valve 14. Also as previously described, a discharge line 34 is connected with each treatment chamber 12 through a second aperture 70 in the vessel front wall 66, for the removal of clarified water.

Drive means are provided for rotating the shaft 17, to move the bands 54 through the suspension. Such means comprise a sprocket 71, attached to the shaft 17 and operatively connected through a chain with a gear reducer driven by a variable speed drive and motor (not shown).

The rotation of the unit 15 is desired to be very slow. By way of example, the pilot unit illustrated was rotated at 3 revolutions per 24 hours.

The Stepping Commutator Assembly

Commutator means are required to distribute power to the anode bars 58.

Conventionally, power distribution involving rotating electr7ical equipment is accomplished by means of brushes and slip rings. However, such means have shortcomings when current demands are high. In particular:
contact pressure is limited to only a few kilograms;
electrical contact resistance between the brush and ring is high and arcing may result;
current levels may not exceed approximately 0.15 amp/cm$^2$;
heat dissipation requirements are large;
and the ring commutators may need to be large in size and this results in high cost.

Recognizing the impact of these limitations on the electroclarification system, where current requirements are very high, applicant has devised a novel commutator assembly 19, which is usefully incorporated in the clarifier 1.

The commutator assembly 19 comprises a central support 77, which is affixed to the drive shaft 17 and which rotates slowly therewith. This support 77 is annular in configuration and is concentric with the drive shaft 17.

A plurality of cylindrical, conductive contacts 78 are carried by the central support 77. These contacts 78 are equally spaced apart and arranged in a circular pattern whose centre coincides with that of the drive shaft 17. The number of contacts 78 so provided is equal to the number of electrode plates 53 in each band 54. The ends of each contact 78 protrude from the end faces of the central support 77, so that said contact can be electrically made at each of its ends.

A conductive wire 79 extends from each contact 78, through the central support 77 and drive shaft 17, to one of the anode strips 59. Thus each of the contacts 78 is adapted to energize one of the electrode plates 53 in each band 54. The cathode wires 62 are grounded to the shaft 17 by a brush and slip-ring assembly (not shown).

In summary, if there are twelve electrode plates 53 in a band 54, then there are provided twelve contacts 78 in the central support 77. Each such contact 78 is adapted to energize one of the electrode plates 53 in each band 54. Corresponding electrode plates 53 in the several bands 54 of the clarifier 1 can thus simultaneously be energized or de-energized through a single contact 78 and wire 79.

The commutator assembly 19 further comprises a pair of free-wheeling support members 80L, 80R, which are mounted on the drive shaft 17. These support members 80L, 80R are annular in configuration and concentric with the drive shaft 17. They are positioned, one at each end of the central support 77, so that they bracket it. Each support member 80L, 80R has an inner bearing 81L, 81R which permits the drive shaft 17 to spin within them. Stated otherwise, the support members 80L, 80R can "free wheel" on the drive shaft 17.

Each support member 80L, 80R carries a set of conductive contacts 82L, 82R. These sets of contacts 82L, 82R are concentrically arranged around the axis of the drive shaft 17 and are distributed to align with the central support contacts 78. Stated otherwise, the contacts 82L, 82R can correspond or register with the contacts 78.

The support member contacts 82L, 82R are longitudinally movable or slidable and can be brought into engagement with the central support contacts 78, when aligned therewith, or can be retracted therefrom. In the embodiment shown, the contacts 82L, 82R are themselves slidable parallel to the longitudinal axis of the drive shaft 17. Alternatively, the contacts 82L, 82R themselves could be stationary in their respective support members 80L, 80R and the latter could be arranged to slide toward or away from the central support 77, to engage or disengage the contacts 82L, 82R with the contacts 78.

Means are provided for biasing the movable contacts 82L, 82R into or out of engagement with the contacts 78. In the embodiment shown, a pair of deformable diaphragms 83L, 83R are mounted on and sealed to the support members 80L, 80R respectively. Each such diaphragm can be expanded by the introduction of air thereunder through the air lines 28, 84, 85, under the control of an air valve system (not shown). Each such diaphragm 83L, 83R is operative, when actuated, to bias its respective contacts 82L or 82R into engagement with the central support contacts 78. Individual springs 86L, 86R are positioned coaxially around the movable contacts 82L, 82R and act to normally urge the latter to the retracted position, out of engagement with the central support contacts 78.

In summary, there are two sets of movable contacts 82L, 82R, such sets being carried by the support members 80L, 80R. When one set of movable contacts is aligned with the central support contacts 78, the appropriate diaphragm 83L, 83R can be expanded to drive its associated movable contacts into engagement with the central support contacts. When this positive drive is released, the springs 86L or 86R return the previously engaged movable contacts to the retracted position.

Power is supplied to the movable contacts 82L, 82R through leads 87L, 87R. These leads are connected to a power source 20 through leads 24.

When the movable contacts of one support member are biased into engagement with the central support contacts, there is sufficient friction grip at the engaged contacts that that support member and the central support rotate together as a unit.

A gear ring 91 is provided which extends concentrically around the central support 77 in radially spaced relation therewith. This gear ring 91 is mounted on a stationary support member (not shown), so that the gear ring is also itself stationary. Three inwardly and radially projecting planetary gears 93 are rotatably mounted to the gear ring 91. These gears 93 are equally spaced around the inner circumference of the gear ring 91. Their function is explained below.

Each support member 80L, 80R carries three racks 94 of gear teeth on its inner end surface. The trio of racks 94 are spaced equidistantly around each said end surface.

Each pair of opposed racks 94 engages one of the planetary gears 93. When the central support 77 is engaged by the movable contacts 82L or 82R of one of the support members, with the result that the latter rotates along with the former, the gears 93 and racks 94 cooperate to rotate the non-engaged support member in the opposite direction and through the same angle of rotation.

As a result of this arrangement, the two support members 80L, 80R each oscillate back and forth through a small rotational angle, while their movable contacts 82L, 82R alternately energize the central support contacts 78.

A conventional microswitch assembly (not shown) is used to control an air supply valve system (not shown) to inflate the appropriate biasing diaphragm when the movable contacts of the disengaged support member 80L or 80R come into alignment with the central support contacts 78; when this occurs, the air valve system functions to momentarily thereafter deflate the biasing diaphragm of the other support member 80L or 80R so that the latter's movable contacts are retracted.

In the operation of the commutator assembly 19, the central support 77 rotates slowly with the drive shaft 17, to which it is affixed. One set of movable contacts 82L, 82R, for example those of the support member 80L, are biased into contact with and are temporarily held in contact with the central support contacts 78. This movement of the contacts 82L is accomplished by expansion of the diaphragm 83L in response to the action of the micro-switch assembly. When the movable contacts 82L contact the central support contacts 78, the electrodes are energized. Therefore, while the electrodes remain energized as a result of these arrangements, the support member 80L rotates through a small rotational angle in conjunction with the central support 77. While this is going on, the gears 93 and racks 94 interact, to cause the non-engaged support member 80R to rotate through an equal angle in an opposite direction.

When the micro-switch assembly senses that a desired extent of rotation of the support member 80L has occurred, it actuates the air control valve system to effect inflation of the diaphragm 83R and deflation of the diaphragm 83L. As a result, the diaphragm 83R drives the movable contacts 82R into engagement with the central support contacts 78, thereby energizing the electrodes and temporarily locking together the support member 80R and central support 77. Simultaneously, the springs 86L and 90L drive the movable contacts 82L into the retracted position. As the support member 80R then rotates in conjunction with the central support 77, the former rotates the free-wheeling support member 80L in an opposite direction through the gear and rack means.

This commutator assembly arrangement has certain features, namely:

(1) since a new engagement between the central support contacts and the movable contacts is always completed before disengagement of the engaged movable contacts, a "make before break" sequence is preferably provided which precludes or reduces arcing;

(2) since the total back and forth angular displacement of either free-wheeling support member is not greater than one half of the angle between adjacent contacts, flexing of the leads 87L, 87R is quite minimal; and (3) since the forces which may be applied to the movable contacts 82L, 82R are relatively high, contact resistance is reduced and permissible electrical currents to the electrodes can be higher than one could obtain with a conventional ring and brush commutator.

Air Control Valve for Solids Removal

As previously described, removal of the clay deposit from the anode bars 58 of each electrode plate 53 is effected by expanding or flexing the elastic sheet 56 associated with said electrode plate. This is done by introducing pressurized air into the space between the elastic sheet 56 and the underlying plate body 54. The timing of the flexing is selected to coincide with the arrival of the electrode plate at the zenith of its travel, when it is overhanging the cavity formed by the containment vessel front wall 66.

To control the admitting and exhausting of pressurized air to and from said space, there is provided a control valve 65.

Figure 14:
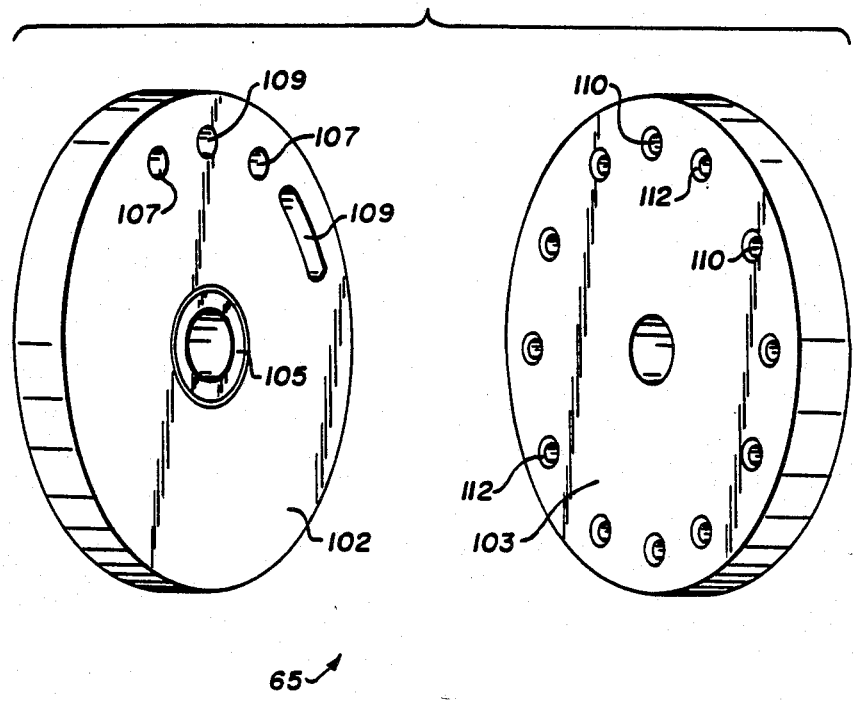
FIG. 14 is an exploded perspective view showing the stationary and rotating discs of an air control valve used in the assembly.
Figure 15:
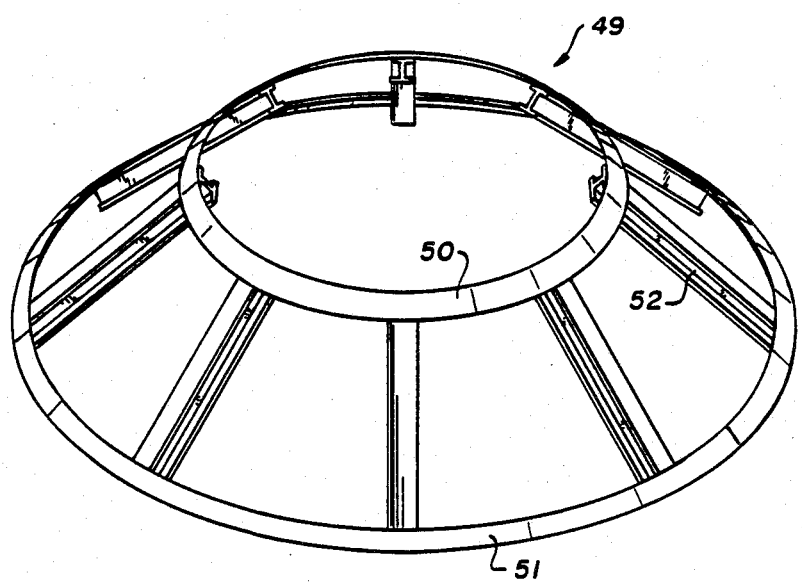
FIG. 15 is a perspective view of the electrode plate rack.

The control valve 65 is illustrated in FIG. 14. It is mounted on the drive shaft 17 and comprises a pair of abutting annular discs 102, 103 held together in face-to-face relation by a collar and spring assembly (not shown).

One such disc 102 is provided with a central bearing 105 and is adapted to permit the drive shaft 17 to spin therewithin. The disc 102 is held stationary by a member secured to the base of the clarifier 1. Said stationary disc 102 is formed to provide a pair of air inlet ports 107, each of which is connected by a tube with the air supply line 28. The stationary disc 102 further forms a pair of air exhaust ports 109 which communicate with the atmosphere.

The second such disc 103 is affixed to the drive shaft 17 and rotates slowly therewith. This rotating disc 103 forms 12 spaced ports 110 arranged in a circular pattern. Each of these ports 110 is connected by a tube with the space between one of the elastic sheets 56 and one of the electrode plate bodies 54. Each port 110 is encircled by an O-ring 112, seated in the disc face, to provide an air-tight seal against the adjacent face of the stationary disc 102.

In operation, when an electrode plate 53 reaches the top of its travel, the port 110 connected with that plate's diaphragm space comes into register with the first air inlet port 107 in the stationary disc 102. Pressurized air enters the space, inflates the elastic sheet 56, and disturbs the solids collected thereon. These solids then drop off the plate 53 and fall into the cavity 113 defined by the vessel front wall 66, from whence they may be removed by a conveyor or the like. As the rotating unit 15 continues to turn, the aforementioned port 110 is moved out of register with the first air inlet port 107 and into register with the first air exhaust port 109. As a result, the supply of pressurized air to the diaphragm space is terminated and air still trapped in the space is exhausted. This procedure is then repeated as the aforesaid port 110 comes into register first with the second air inlet port 107 and then with the second air exhaust port 109. For the balance of the travel of said plate 53, the sheet 56 remains deflated.

Flow Distribution Means

It will be appreciated that the treatment chambers 12 have different volumes—yet the retention time in each should remain generally the same. As a result, it is desirable to distribute varying quantities of feed slurry to the different chambers.

The combination of a valve 14, in each feed line 13, and an adjustable period, pneumatic sequencing timer (not shown), is used to control the distribution of the feed.

The embodiments of the invention in which an exclusive property or privilege is claimed are defined as follows:

1. A commutator assembly for supplying electrical power to a rotating structure having one or more elements to be energized, comprising:
    a central support affixed to the structure for rotation therewith, said support carrying a plurality of contacts arranged along a circular line having a centre which coincides with the axis of rotation;
    conductive means connecting said contacts with the elements to be energized;
    first and second support members mounted on the structure and arranged to bracket the central support;
    said support members being adapted to free wheel on the structure;
    each support member carrying a plurality of contacts which are arranged to correspond with the central support contacts;
    each of said support members or its contacts being movable, whereby the contacts may be biased into or out of engagement with the central support contacts;
    lead means for connecting the support member contacts with a source of electric power;
    means, associated with the first support member, for biasing its contacts into engagement with the central support contacts when said contacts are aligned and for disengaging them when the second support member contacts first engage the central support contacts;
    means, associated with the second support member, for biasing its contacts into engagement with the central support contacts when said contacts are aligned and for disengaging them when the first support member contacts first engage the central support contacts;
    said first support member and central support being operative to rotate together when their respective contacts are engaged;
    said second support member and central support being operative to rotate together when their respective contacts are engaged; and
    means, interconnecting the support members, for rotating the support member, whose contacts are not engaged, in a direction opposite to that in which the engaged support member is being rotated by the central support, and through an angle equal to that through which the engaged support member is rotated, whereby the two support members each oscillate back and forth through a small angle while their contacts alternatively energize the central support contacts.

* * * * *